Dec. 1, 1925.
E. M. ANSCOMBE
INHALATION KETTLE
Filed Aug. 18, 1920
1,563,316
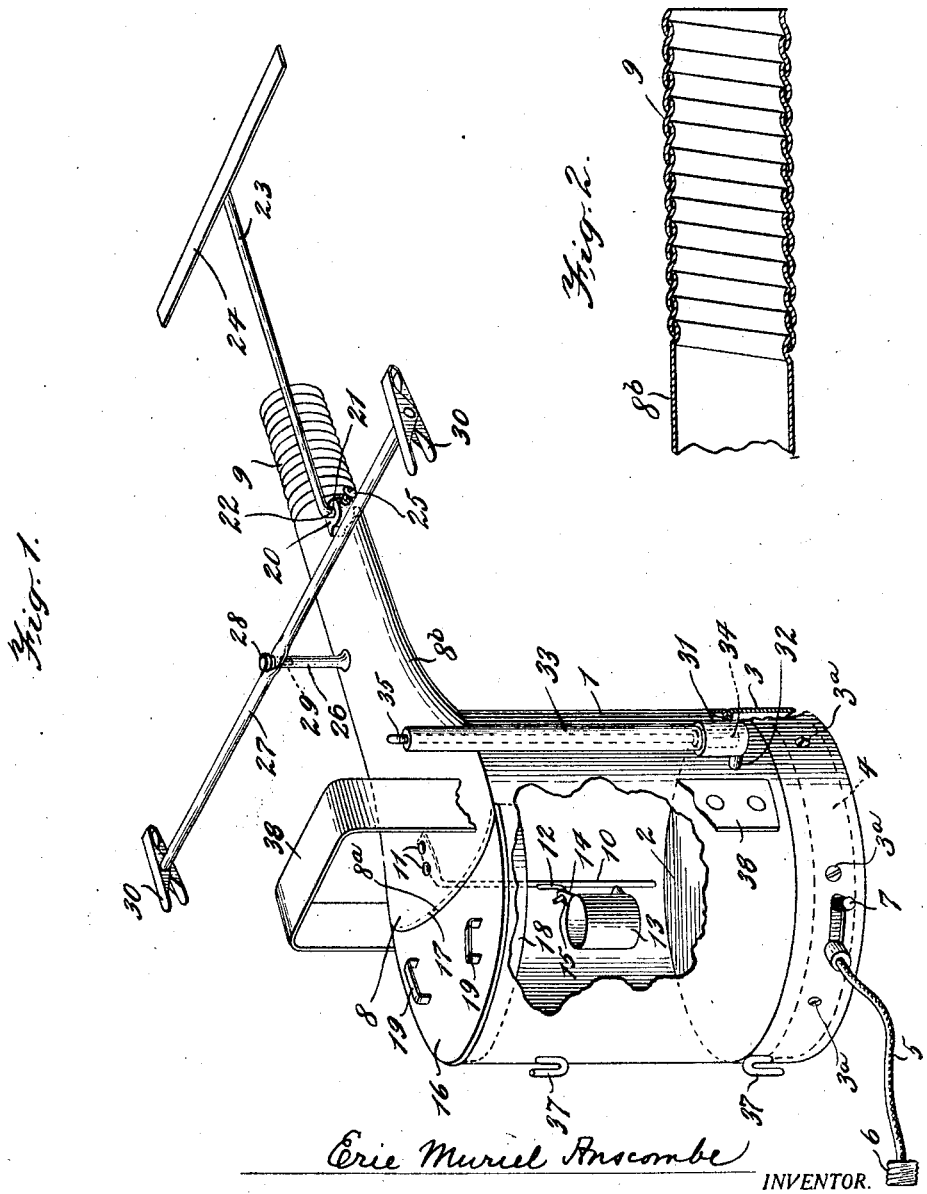

Patented Dec. 1, 1925.

1,563,316

UNITED STATES PATENT OFFICE.

ERIE MURIEL ANSCOMBE, OF CLEVELAND, OHIO.

INHALATION KETTLE.

Application filed August 18, 1920. Serial No. 404,305.

*To all whom it may concern:*

Be it known that I, ERIE MURIEL ANSCOMBE, a citizen of Canada, residing at Cleveland, in the county of Cuyahoga and State of Ohio, have invented certain new and useful Improvements in an Inhalation Kettle, of which the following is a specification.

My invention relates to new and useful improvements in inhalation apparatus, and particularly contemplates an improved kettle for the generation of vapor for inhalation purposes.

The invention consists in the improvements to be more fully described hereinafter, and the novelty of which will be particularly pointed out and distinctly claimed.

In the accompanying drawings to be taken as a part of this specification, I have fully and clearly illustrated a preferred embodiment of my invention, and wherein—

Figure 1 is a view in perspective of my invention, parts being broken away in order to illustrate internal structure, and Fig. 2 is a detail sectional view through a spout illustrated in Fig. 1.

Referring to the drawings by characters of reference, 1 designates a receptacle or kettle which, for the purposes of my invention, in its preferred form, is substantially cylindrical in form, and is provided with a bottom 2 and a depending annular flange 3 extending below the said bottom, as shown in Fig. 1, and constituting a base upon which the kettle rests when in use. Within the space afforded by the said bottom 2 and the flange 3, and secured to the latter by screws 3ª is located an electric resistance heater or plate 4, of any suitable type, which may be connected by circuit wires 5, with any suitable source of current, preferably by means of a screw plug 6. The heater is preferably of the type adapted to give different degrees of heat controlled by a suitable switch 7. In view of the fact that the heater and switch, in and of themselves, are not of my invention, and various types may be employed, all of which are well-known for heating purposes, I do not deem it necessary to specifically illustrate or describe the details thereof for the purposes of this application. The heater serves to supply the necessary heat to vaporize water contained in the kettle 1, to form steam to mix with a vaporized inhalant, as will be hereinafter described.

At its upper portion the receptacle 1 is, in part, closed by a cover portion 8, preferably made rigid and integral with the upper end of the receptacle, and having a curved edge portion 8ª extending over the upper end of the kettle transversely of the latter. The said cover portion 8 merges into an exit spout 8ᵇ, which is preferably rigid, and integral with the cover portion 8, said spout being provided at its extreme end or outlet with a laterally adjustable exit portion 9, preferably made of the well-known flexible friction joint or coil construction, as shown in section in Fig. 2, whereby the said exit portion may be deflected or adjusted laterally in any desired direction, in order to direct the vapors flowing from the kettle in the desired direction.

Means are provided for containing and supporting within the said receptacle 1 the medicament or inhalant which it is desired to vaporize. This means consists preferably of a supporting bar 10 having one end rigidly connected to the said cover 8 by means of rivets, as at 11, from which point said bar depends within the receptacle 1, to a point preferably short of the bottom of said receptacle. Upon this bar 10 is a suitable supporting device, preferably in the form of a hook 12, adapted to support detachably a cup 13 adapted to contain the material to be vaporized. The cup 13 is preferably supported from the hook 12 by means of an ear or lug 14 having an opening 15 adapted to detachably engage the said hook. The cup 13 is preferably supported at a height above the water level in the kettle, so that the water will not enter the cup.

The upper end of the receptacle is completely closed by a crescent-shape cover 16 having a curved forward edge 17 adapted to fit under the curved portion 8ª of the fixed cover, heretofore described; and said cover 16 is also provided with a depending flange 18 adapted to tightly engage the inner face of the wall of the receptacle 1 to make a proper seal, so that vapors generated within the receptacle will not leak out around the cover. The removable cover may be provided with one or more handles 19, of any suitable form.

Upon the exit spout, and preferably the rigid portion 8ᵇ thereof, is a lug 20, having an opening 21, in which is pivotally and detachably seated an angular portion 22 on a supporting member 23 extending in a general direction longitudinally of the spout, and preferably to a point in advance of the exit end of the latter. Upon its extreme outer end, that is, that end in advance of the exit from the spout, the member 23 is provided with a transverse supporting means, preferably in the form of a horizontal bar 24, the ends of which extend laterally a suitable distance either side of the longitudinal center of the exit spout. In use, inhalation kettles are often arranged under a covering, such as a sheet overlying a patient, so that the vapor will be confined, in order that the patient may receive the most effective treatment from the vapor, and this bar 24 serves to support the covering out of direct path of the vapor issuing from the spout, or from falling down over the spout so as to intercept the issuing vapor, and prevent it from flowing uninterruptedly into the space occupied by the patient under the cover. The part 22 constitutes a pivot, whereby the bar 23 and supporting member 24 may be swung laterally to assume a desired position relative to the exit of the spout, no matter to what position the flexible portion 9 of the spout may be adjusted, in order that the supporting device 24 may be placed in proper position to support a covering relative to the spout in all positions of adjustment of the latter. The pivot 22, and consequently the supporting member 24 are held in adjusted position by means of a set-screw 25 threaded through the lug 20, and adapted to impinge the said pivot 22.

Mounted upon the spout, and preferably upon the rigid portion 8$^b$ thereof, is additional means for supporting and preferably securing a covering, such as a sheet or other fabric out of contact with the spout and the kettle. This means preferably consists of a vertical post 26 carried by the spout and preferably fixed thereto, upon the upper end of which post is supported a transverse member, preferably in the form of a bar 27, the latter being secured at an intermediate point to the upper end of said post by means of a set-screw 28 passed through an opening in the said bar and threaded into the post 26, as indicated at 29. At its ends the member 27 may be, and preferably is provided with spring clips 30, or other suitable attaching devices, adapted to grip the edge portion of a sheet or other covering and hold it in distended position and out of contact with the adjacent portion of the kettle.

I desire it understood that the inhalation kettle does not necessarily have to be used in connection with a covering over the patient, but when so used, the spout provides efficient means for directing the flow of vapors in the desired direction, and the elements 24 and 27 afford a support for a covering so that the latter does not interfere with the most efficient operation of the kettle and the flow of the vapor therefrom.

When in use, whether or not in connection with a sheet or other covering, the kettle is supplied with water to the desired level, and the cup 13 is supplied with the desired medicament to be vaporized by and disseminated with steam generated from the water. The cover 16 is then tightly applied, and the kettle is located at the desired point demanded by the treatment of the patient. Suitable electrical connection being made by means of the conductors 5 and plug 6, to a source of current, the switch 7 is adjusted to cause the heater 4 to give the desired heat, which will cause the water within the receptacle 1 to vaporize or boil, the steam thus generated serving to vaporize the medicament in the cup 13, which vapor mixes with the steam and is carried out by the steam through the spout 8$^b$ to the desired point.

I may provide the receptacle with a suitable float gauge consisting of a float chamber 31 connected by a tube 32 to the low water level point in the kettle, from which chamber rises a cylindrical tube 33 open at its upper end. In the float chamber is a cylindrical float 34 of such diameter that it may pass up into the tube 33, said float carrying a vertical indicator rod 35, the upper end of which projects through the open upper end of the tube 33, and bears indicators to show the level of the water in the kettle. In the position shown in Fig. 1, the rod 35 is shown in the position it assumes when the water is at its lowest level. It will be understood that the level of the water in the float chamber and tube will be the same as that in the kettle, and that the position of the float will correspond to any changes in the water level. This float gauge enables the attendant or nurse to maintain the proper supply of water within the kettle.

The kettle may also be provided with suitable hooks 37 about which the cord 5 may be wound when the kettle is being transported from place to place. The kettle is also provided with a suitable handle 38, by means of which it may be conveniently transported.

What I claim and desire to secure by Letters Patent of the United States is:—

1. An inhalation kettle comprising a receptacle having a laterally extending exit spout, and means for supporting an overlying covering, said means including a supporting bar supported on and carried by the spout and extending lengthwise thereof, said supporting bar carrying a bar located in advance of the exit of said spout, the ends of the latter bar being on opposite sides of the spout.

2. An inhalation kettle comprising a receptacle having an exit spout, a covering-supporting member mounted on said spout and extending transversely thereof in rear of said exit, a second covering-supporting member extending transversely of said spout and located in advance of said exit, and covering-securing means carried by said first-named supporting member.

3. An inhalation kettle comprising a receptacle having a laterally extending exit spout, a covering-supporting means mounted on and carried by the kettle and including a bar arranged transversely of the spout in rear of the exit thereof and with its ends located on opposite sides of the spout, and a second covering-supporting means also mounted on and carried by the kettle, and including a bar arranged transversely of the spout in advance of the exit thereof and with its ends located on opposite sides of the spout.

4. An inhalation kettle comprising a receptacle having an exit spout, a transverse covering-supporting member mounted on the exit spout in rear of the exit of the spout, means whereby said member is adjustable relative to the said spout, and a second covering-supporting means mounted on the spout and having a supporting member arranged in advance of the exit of the spout 5. An inhalation kettle comprising a receptacle having an exit spout, a covering-supporting member pivotally mounted on said spout and extending transversely of the latter, and means for securing the said covering supporting member on its pivot in different positions transversely of the spout.

6. An inhalation kettle comprising a receptacle, means carried by the receptacle for heating the same, a cover portion partially closing the said receptacle, a supporting device carried by said cover portion and extending within the receptacle, a medicament cup carried by said support, said cover portion merging into an exit spout, and a removable cover portion cooperating with said first-named cover to close the kettle.

7. An inhalation kettle comprising a receptacle, means carried by the receptacle for heating the same, a cover portion partially closing the said receptacle, a supporting device carried by said cover portion and extending within the receptacle, a medicament cup carried by said device, said cover portion merging into an exit spout, a removable cover portion cooperating with said first-named cover to close the kettle, said spout having a flexible exit end, and means carried by the spout for supporting a covering out of direct path of the vapor flowing from said exit.

8. An inhalation kettle comprising a receptacle, an exit spout from the receptacle, a post on the spout, a transverse covering-supporting member supported on said post and located in rear of the spout exit, and a second covering-supporting member carried by the spout and having a supporting part arranged in advance of the exit of the spout.

9. An inhalation kettle comprising a receptacle having an exit spout, a post on the exit spout, a transverse covering-supporting member mounted on the post and adjustable on said post as a pivot center, means for securing said member in different adjustments, and a second covering-supporting member secured to the spout and having a covering-supporting part in advance of the exit of the spout.

In testimony whereof I have hereunto signed my name.

ERIE MURIEL ANSCOMBE.